Figure 1:
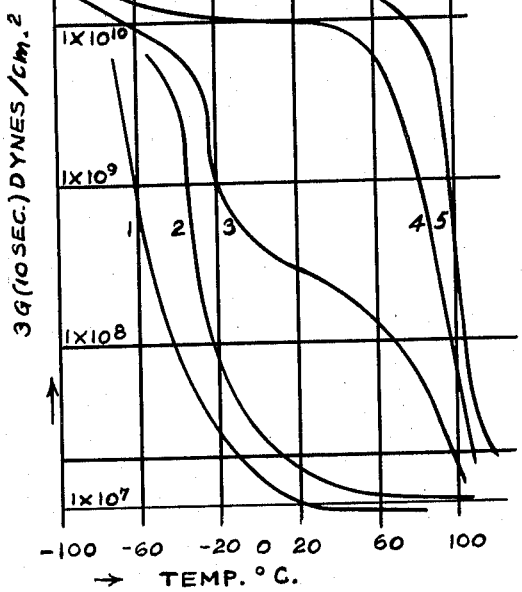

INVENTORS
ARTHUR V. TOBOLSKY
ALAN REMBAUM
BY Emery, Whittemore,
Sandoe & Graham

ATTORNEYS

INVENTORS
ARTHUR V. TOBOLSKY
ALAN REMBAUM

ATTORNEYS

United States Patent Office 3,257,476
Patented June 21, 1966

3,257,476
BLOCK COPOLYMERS HAVING URETHANE LINKAGES BETWEEN A PREFORMED POLYMER HAVING AT LEAST ONE ACTIVE HYDROGEN ATOM AND A POLYVINYL CHAIN
Arthur V. Tobolsky, Princeton, N.J., and Alan Rembaum, Altadena, Calif.
Filed Sept. 5, 1961, Ser. No. 165,980
8 Claims. (Cl. 260—859)

This invention is concerned with the preparation of new polymers.

It is an object of this invention to provide novel block polyvinyl polymers. It is also an object of this invention to provide a novel process for the preparation of block polymers by the polymerization of ethylenically unsaturated monomers. This invention also contemplates providing novel polymeric peroxy carbamates.

We discovered novel polymeric peroxy carbates that can be used to prepare novel block polymers. The peroxy carbamates are used to catalyze the free radical polymerization of ethylenically unsaturated monomers to form block polymers consisting of polyvinyl chains joined to the polymeric residue of the peroxy carbamate.

Peroxy carbamates are prepared by reacting a hydroperoxide compound with a compound containing one or more isocyanate groups. The reaction is illustrated in the following equation:

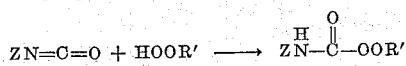

wherein the zig-zag refers to polymeric organic residue, and R′ refers to a hydrocarbon group. The peroxy carbamate containing material initiates the polymerization of ethylenically unsaturated compounds by a free radical mechanism. The residue of the peroxy carbamate becomes a part of the polymer chain and is linked to the resultant polyvinyl polymer as shown in the following representation:

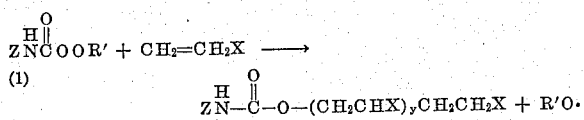

and/or

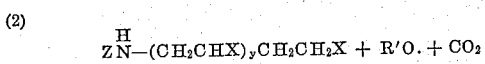

where X is a substituent on the carbon such as a halide, cyano groups, phenyl group, etc. Some of the ethylenically unsaturated monomer reactant may homopolymerize, initiated by the R′O· radical from the peroxy carbamate. Our polyvinyl polymers are characterized by the linking of the polyvinyl chain to the polymeric residue of the peroxy carbamate (designated as Z) through the nitrogen containing moieties

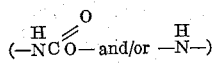

referred to herein for the sake of simplicity as the "urethane" linkage. The "urethane" linkage formed need not follow the reaction mechanism scheme nor indeed the sequence of reactions shown above. An identical urethane linkage would be formed from the same reactants with a hydroxy terminated polystyrene being first formed by reaction of the hydroperoxide and styrene, followed by addition of the hydroxyl to the isocyanate.

The peroxy carbamates are used to initiate the free radical polymerization of compounds containing at least one ethylenic unsaturation. These are the polymerizable diene and vinyl monomers. They are illustrated by the vinyl monomers, such as vinyl chloride, vinyl acetate, vinyl alcohols, styrene, methylvinyl ketone, vinylidene chloride, etc.; the acrylic esters, such as methyl and ethyl acrylates, chloroacrylic esters and methacrylic esters; acrylonitrile, methacrylonitrile, and dienes such as butadiene, isoprene, and chloroprene. The terms "polyvinyl" and "polyvinyl polymers" are used herein to refer to polymers formed by the polymerization of these ethylenically unsaturated monomers. The polyvinyl portion of our novel polymers may be of a homopolymeric nature or copolymeric where it is copolymerized from two or more ethylenically unsaturated monomers.

The hydroperoxides used in forming the peroxy carbamates are characterized by having one or more terminal OOH groups. Cumene hydroperoxide, and t-butyl hydroperoxide are the hydroperoxides in widest commercial use. Other useful hydroperoxides include tetralin hydroperoxide, phenylcyclohexane hydroperoxide, diisopropylbenzene hydroperoxide, p-menthane hydroperoxide, pinane hydroperoxide, and 2,5-dimethylhexane-2,5-dihydroperoxide. The reaction of the isocyanates with hydroperoxides can be catalyzed by a base such as pyridine or trimethyl amine to achieve faster reaction time at ordinary temperatures.

Peroxy carbamates having a polymeric constituent (designated hereinbefore by the symbol Z) with a molecular weight of at least about 1000 are preferred. With polymeric materials of large size, the residue incorporated in the resultant block polymer is sufficiently large to significantly affect the properties of the block polyvinylpolymer. A variety of isocyanate-containing polymers are useful in the preparation of the peroxy carbamate polymerization catalysts, dependent upon the properties desired. Peroxy carbamates prepared from polymeric materials containing only one isocyanate group in the polymer chain may be used to prepare block polymers containing only one block sequence, i.e., the polymeric residue of the peroxy carbamate is linked to the polyvinyl block through the urethane linkage. Peroxy carbamates prepared from polymeric materials containing two or more isocyanate groups are used to prepare most of the contemplated block polymers. Polymeric materials containing isocyanate groups may be prepared by conventional means. A relatively simple preparatory process involves reacting diisocyanates, such as 2,4-toluene diisocyanate, 4-m-phenylene diisocyanate, hexamethylene diisocyanate and pentamethylene diisocyanate, with polymeric materials having functional groups with active hydrogen atoms (positive Zerewitinoff test) such as the hydroxyl carboxyl, amine, and mercaptan groups. At least one molecule of diisocyanate for each active hydrogen should be used. Other useful isocyanates for this purpose include the diphenylmethane diisocyanates; dianisidine diisocyanate, such as 3,3 dimethoxy-4,4′-biphenylene diisocyanate; bitolylene diisocyanate, such as 3,3′-dimethyl-4,4′-biphenylene diisocyanate; diphenyldiisocyanate, such as xenylene 3,3′-diphenyl-4,4′ biphenylene diisocyanate, xenylene diisocyanate, such as 4,4′-biphenylenediisocyanate; dichloroxenylene diisocyanate, such as 3,3′-dichloro-4,4′-biphenylene diisocyanate; and triisocyanates such as 2,4,4′-triisocyanatediphenyl ether. Polymeric isocyanate containing materials prepared from diisocyanates, as exemplified by 2,4-toluene diisocyanate, have the following representation

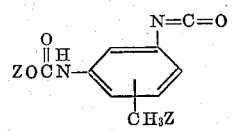

The resultant block polymer with the polymeric residue linked to the polyvinyl chain through the urethane linkage, has the following representation

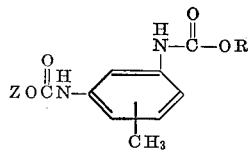

wherein R represents the polyvinyl chain.

The particular polymer selected for the preparation of the polymeric peroxy carbamate and which eventually becomes a block of the polyvinyl block polymer is dependent upon the desired properties of the block polymer. Any polymeric material having desired properties and containing an isocyanate group or groups and/or an active hydrogen, may be utilized. The commercially available polyesters and polyethers such as the polypropylene oxides and the polyethylene oxides, having molecular weights * between about 1000 and 4000 are preferred for many of the contemplated polymers. The term polymeric peroxy carbamates as used herein is meant to include high molecular weight (above ~1000) long-chain materials, such as those disclosed as the prepolymer of Example 8 herein.

The polymerization process utilizing the peroxy carbamates to catalyze ethylenically unsaturated monomers may result in block polymers of varied properties, chain lengths, etc., dependent upon the materials and conditions utilized. The ratio of the ethylenically unsaturted monomer to the peroxy carbamate reactant can vary widely. To obtain block polymers having properties which are attributed to the polyvinyl chains and also to the polymeric residue of the peroxy carbamates, the ratio of the ethylenically unsaturated monomer to the peroxy carbamate reactant should be between 20:1 and 1:20, and preferably between 4:1 and 1:4.

Diperoxy carbamates prepared from polymeric moieties with terminal isocyanate groups result in block polymers, after polymerization, having a polyvinyl chain attached to each end of the residue of the polymeric diperoxy carbamate. In somewhat similar manner it is possible to prepare block polymers containing multiple polyvinyl side chains or blocks. These polymers are also often termed "graft" polymers and may be prepared by treating a polyol, or a polymer such as a homopolymer or a copolymer of polyvinyl alcohol, with diisocyanates to form a material containing multiple isocyanate moieties as substituents on the chain. After treatment with a hydroperoxide to form the corresponding peroxy carbamate moieties these materials may be used to catalyze the formation of ethylenically unsaturated monomers; resulting in block polymers with multiple polyvinyl substituents attached to the basic chains through the residues of the carbamate moieties.

The polymers of this invention are also defined by the following representations:

(1) A block copolymer $$(Ra)_nZ$$

wherein R is a polyvinyl chain,
n is an integer,
a is a urethane linkage, and is substantially the only link between R and Z, and
Z is a polymeric moiety derived from a polymer having at least one active hydrogen atom and has a molecular weight of at least 1000 and is also at least 20% by weight of the block copolymer.

(2) A block copolymer containing as repeating units $$[(aRa)Z]_y$$

---
* As obtained by present conventional methods such as hydroxyl number.

wherein
R is a polyvinyl chain,
a is a urethane linkage and is substantially the only link between R and Z,
y is an integer, and
Z is a polymeric moiety derived from a polymer having at least two active hydrogen atoms and comprises a polymer in which all carbon to carbon bonds are saturated with respect to vinyl type polymerization and is at least 20% by weight of the block polymer.

(3) A branched or cross-linked copolymer containing as repeating units $$[(aRa)_nZ]_y$$

wherein
y is an integer and
n is an integer, two or larger
R is a polyvinyl chain,
a is a urethane linkage and is substantially the only link between R and Z, and
Z is a polymeric moiety derived from a polymer having at least two active hydrogen atoms and comprises a polymer in which all carbon to carbon bonds are saturated with respect to vinyl type polymerization and is at least 20% by weight of the block polymer.

The preparation of the novel block polymers is generally carried out in a two step or a one step process. In the two step process often referred to hereinbefore for illustrative purposes, a starting material containing the isocyanate moieties is reacted with a hydroperoxide to form the corresponding peroxy carbamate. This peroxy carbamate is then utilized to catalyze the polymerization of ethylenically unsaturated monomers to obtain a block polyvinyl containing polymer. The polymerization may be carried out in a one step process by simultaneously reacting the isocyante containing starting material with the ethylenically unsaturated monomers in the presence of a hydroperoxide. The conditions of the polymerization are dependent upon the materials utilized and the product desired. They may be controlled to yield relatively short chain polyvinyls. They may also be controlled to prepare high molecular weight polyvinyls at each of the residues of the peroxy carbamate moities. In the one step process and also in the polymerization step of the two step process, the reaction may be modified and/or controlled by using auxiliary catalysts, initiators, accelerators, cross-linking agents such as tetraethylene glycol dimethacrylate, etc. The polymerization conditions are similar to those known for the free radical polymerization of ethylenically unsaturated monomers to form polyvinyl polymers, using a peroxide type catalyst.

Our invention is further explained and illustrated in the following examples: In Examples 1, 3, 4, 5, 6, 7, 9 and 10 a polyether prepolymer is utilized as a reactant. This prepolymer was prepared by reacting a hydroxy terminated polypropylene oxide (2 hydroxyl groups per polymeric chain, molecular weight about 1800) with 2,4-toluene diisocyanate (mole ratio of 1:2). The polyester prepolymer utilized in Example 2 was prepared by reacting a hydroxy terminated polyester of adipic acid, ethylene glycol, and propylene glycol (2 hydroxyl groups per polymeric chain, molecular weight about 2,000) with 2,4-toluene diisocyanate (mole ratio of 1:2). The prepolymer used in Example 8 consisted of castor oil (mixed glycerides of ricinoleic (85%) and oleic acid (15%), the main fraction of which has three hydroxyl groups per chain) whose hydroxyl groups were reacted with 2,4-toluene diisocyanate (mole ratio of 1:3). Finally the prepolymer of Example 11 consisted of polypropylene oxide with one hydroxy group per chain (molecular weight about 1700) which also reacted with 2,4-toluene diisocyanate.

Example 1A 2.41 g. of polyether prepolymer is dissolved in 7.59 g. of styrene, distilled from calcium hydride, in a dry glass jar provided with a gas tight lid. 0.22 g. of commercial t-butyl hydroperoxide, dried over magnesium sulfate and 0.05 g. of dry pyridine is added to the mixture. The whole is kept in the closed container at room temperature for 12 hours, then heated in an oven at 73° C.±2° for 24 hours. The polymer formed is extracted with benzene and heated in a mold at 250° F. and at 30,000 lbs./sq. in. for 15 minutes. The elastic modulus of the film obtained is shown in FIG. 1, curve 4.

Examples 1B and 1C

Identical conditions and procedures were followed as in Example 1A. The amounts of reactants utilized are shown below:

|  | Example 1B | Example 1C |
|---|---|---|
| Polyether prepolymer, g | 5 | 7.5 |
| Styrene, g | 5 | 2.5 |
| t-Butyl hydroperoxide, g | 0.45 | 0.675 |
| Pyridine, g | 0.05 | 0.05 |

Figure 2:
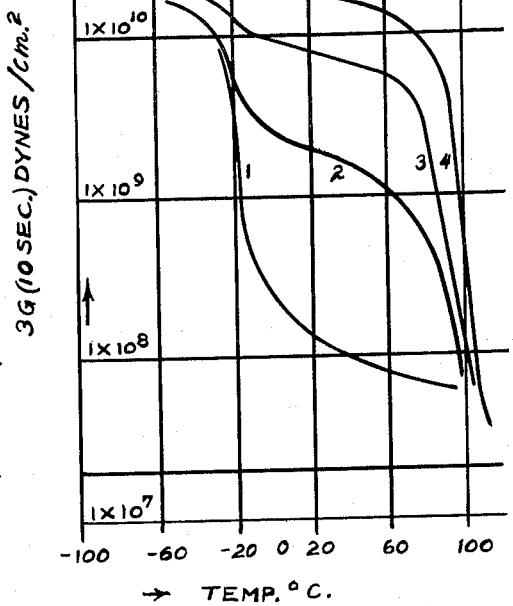

The elastic modulus of the molded film obtained from the polymer of Example 1B is shown in FIGURE 1 as curve 3. The elastic modulus of the film obtained from the material of Example 1C is shown in FIGURE 2 as curve 2. In the same FIGURE 1 are shown the elastic moduli of pure polystyrene (curve 5) and polypropylene oxide ("polyether prepolymer" reacted with ethylene damine, curve 1).

Example 2A 4.2 g. of polyester prepolymer is dissolved in dry benzene in a 50 cc. Pyrex flask. 1 g. of t-butyl hydroperoxide of the same grade as described in Example 1 is added. The mixture is left standing for 60 minutes at room temperature and the solvent and unreacted hydroperoxide distilled off in high vacuum. The pumping at 30° is continued for 6 hours to remove traces of unreacted hydroperoxide. 5.8 g. of dry styrene is next added to the flask contents and the mixture degassed by freezing and thawing three times in a high vacuum system. The flask is sealed off at a pressure of $10^{-6}$ mm. Hg and placed in an oven maintained at 73°±2°. After 24 hours of heating the polymer is extracted with benzene, dried in vacuum oven at 70° C. and molded between plates of a hydraulic press at 250° F. and 30,000 lbs./sq. in for ten minutes. The elastic modulus of the tough film obtained is shown in FIGURE 2, curve 2.

Example 2B 3 g. of polyester prepolymer is dissolved in 9 g. of dry styrene in a dry glass jar fitted with a gas tight lid. 0.24 g. of dry t-butyl hydroperoxide and 0.05 g. of pyridine is added. The mixture is kept in the closed glass jar at room temperature for 12 hours, then heated in an oven at 73°±2° for 24 hours. The polymer formed is extracted with benzene, dried and molded at 250° C. and 30,000 lbs./sq. in. for 15 minutes. The elastic modulus of the film obtained is shown in FIGURE 2, curve 3. FIGURE 2 also contains curves 1, which depicts the elastic modulus of the polyester prepolymer reacted only with ethylenediamine, and curve 4, which depicts the elastic modulus of pure polystyrene.

Example 2C 4.2 g. of polyester prepolymer is dissolved in dry benzene in a 100 cc. Pyrex flask. 1 g. of t-butyl hydroperoxide and 0.05 g. of pyridine is added. The mixture is left standing for 60 minutes at room temperature. 50 cc. of dry n-heptane is added to precipitate the prepolymer diperoxycarbamate and dissolve any unreacted t-butyl hydroperoxide. The liquid portion is then decanted and the process of dissolution in benzene and precipitation with n-heptane is repeated twice. Any remaining traces of solvent are distilled off under high vacuum and the pumping is continued for 6 hours at 30° C. After addition of 5.8 g. of dry styrene and thorough mixing the identical procedure of Example 2A is followed.

The elastic modulus versus temperature curve of a molded film was found to be practically identical to curve 2 in FIGURE 2.

Example 3A(1)

Figure 3:
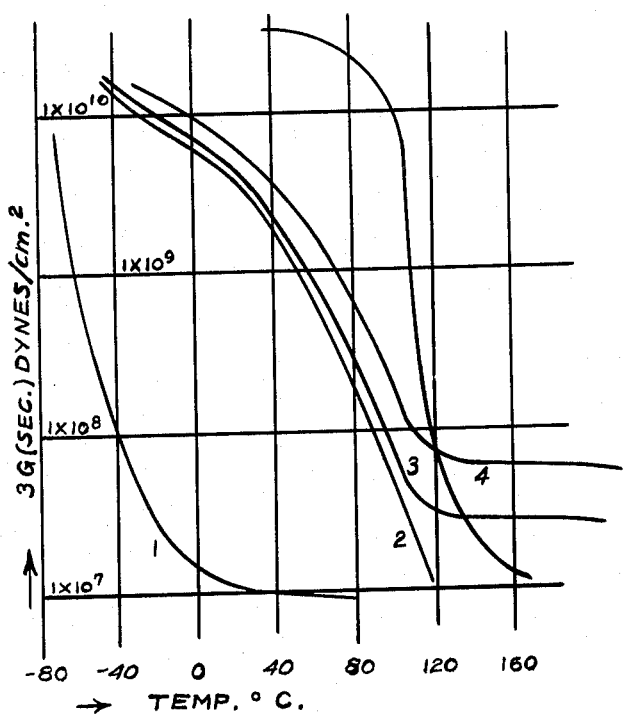

2.63 g. of polyether prepolymer is dissolved in 7.37 g. of methyl methacrylate and dried with calcium hydride, in a dry glass jar. 0.24 g. of t-butyl hydroperoxide and 0.025 g. of pyridine are added to the mixture and the closed container is placed in an oven at 73°±2° for 24 hours. The polymer formed is pressed at 250° and 30,000 lbs./sq. in. for 1 minute, to yield a transparent film, the elastic modulus of which is shown in FIGURE 3, curve 2.

Example 3A(2)

Identical amounts, conditions and procedure as described in Example 3A(1), except that 0.5 g. of commercial cumene hydroperoxide freshly dried over magnesium sulfate is used. The film obtained after molding has the same elastic modulus as the polymer produced by the use of t-butyl hydroperoxide and described in Example 3A(1).

Example 3B

A film is cast, by heating at 73°±2° for 24 hours a mixture of the following components:

|  | G. |
|---|---|
| Tetraethyleneglycoldimethacrylate (T.E.G.D.M.) | 0.5 |
| Polyether prepolymer | 2.63 |
| Methyl methacrylate | 7.37 |
| t-Butylhydroperoxide | 0.24 |
| Pyridine | 0.05 |

The elastic modulus of the film obtained is shown in FIGURE 3, curve 3.

Example 3C

Identical amounts and conditions are used as in Example 3B, except that 2 g. of T.E.G.D.M. is added. The elastic modulus of the film obtained is shown in FIGURE 3, curve 4. FIGURE 3 also contains curves depicting the elastic moduli of the polyether prepolymer reacted with ethylenediamine and of the pure polymethylmethacrylate, for comparative purposes.

Figure 4:
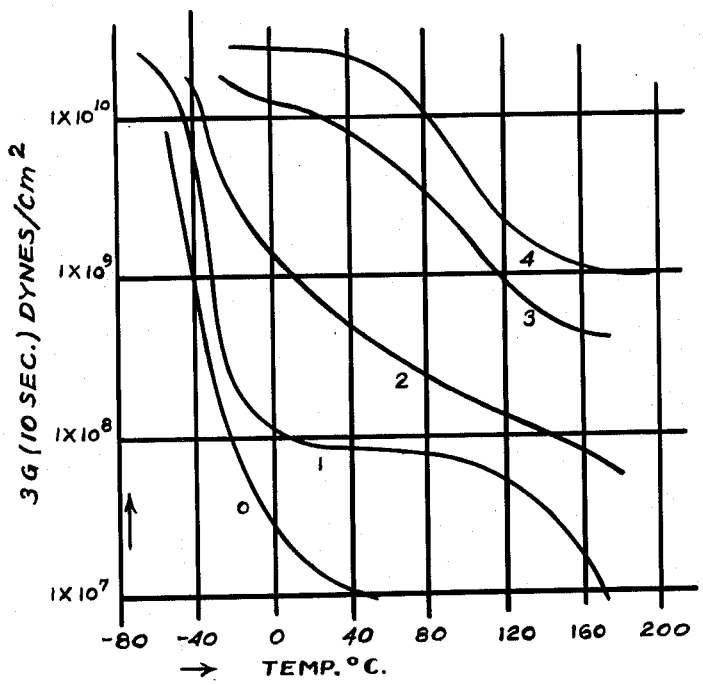

Example 4A 6.6 g. of polyether prepolymer is dissolved in 23.9 g. of acrylonitrile in a glass container provided with a gas tight lid. The commercial acrylonitrile used in this and the following examples is purified by passing it through a column of silica gel immediately before reaction. 0.6 g. of commercial t-butyl hydroperoxide, dried with magnesium sulfate, is added to the mixture and the whole is kept for one hour at room temperature in the closed glass container. At the end of this time it is placed in an oven maintained at 73°±2°. After heating for 24 hours the polymer is removed and molded at 250° F. for ten minutes at a pressure of 30,000 lbs./sq. in. The elastic modulus at various temperatures of the clear film obtained is shown in FIGURE 4, curve 3.

Examples 4B and 4C

Identical conditions and procedures with those in Example 4A were utilized but the relative amounts of the components were varied as shown below:

|  | Example 4B | Example 4C |
|---|---|---|
| Polyether prepolymer, g | 11.4 | 17.1 |
| Acrylonitrile, g | 11.4 | 4.0 |
| t-Butyl hydroperoxide, g | 1.0 | 1.5 |

The transparent film obtained after molding the polymer prepared in Example 4B was tested and its elastic modulus shown in FIGURE 4, curve 2. Similarly, the elastic modulus of the rubbery film obtained after molding the material of Example 4C is shown in FIGURE 4, curve 1.

In the same figure are shown the elastic modulus versus temperature curves of pure polyacrylonitrile (curve 4) and of the polyether prepolymer reacted with ethylene diamine (curve 0).

Example 5A

The following dry components are mixed to yield a homogeneous solution:

|  | G. |
|---|---|
| Polyether prepolymer | 5 |
| Styrene | 5 |
| t-Butyl hydroperoxide | 0.45 |
| Dicumylperoxide | 0.05 |
| Pyridine | 0.05 |

A film is cast from the above mixture by heating it in a mold at 50° C. for 12 hours and at 100° C. for an additional period of 12 hours.

Examples 5B, 5C, 5D and 5E

Four identical mixtures of Example 5A are prepared, 2, 10, 20 and 30% by weight of T.E.G.D.M. are added separately. Films are cast by the procedure of Example 5A.

Figure 5:
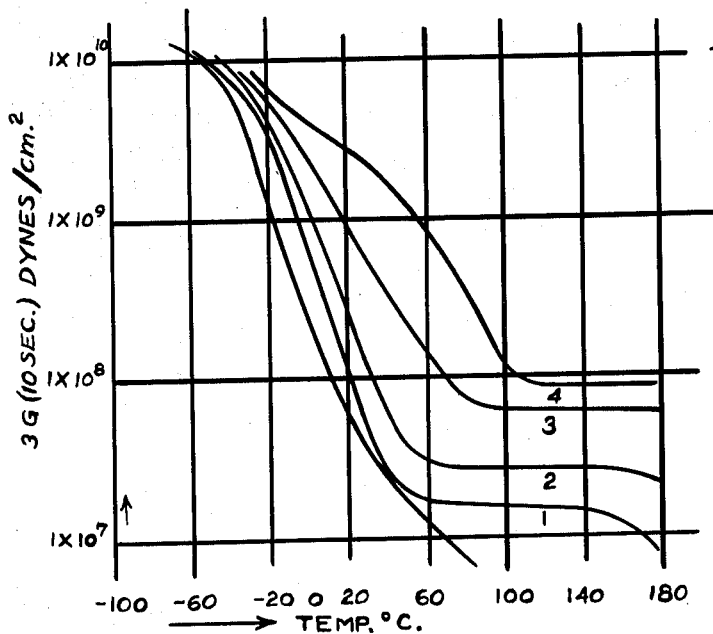

The elastic moduli versus temperature curves of the polymeric films of Example 5A (without T.E.G.D.M.), Example 5B (2% T.E.G.D.M.), Example 5C (10% T.E.G.D.M.), Example 5D (20% T.E.G.D.M.) and Example 5E (30% T.E.G.D.M.) are shown in FIGURE 5 as curves 0, 1, 2, 3, and 4 respectively. These curves illustrate the effect of crosslinking agent on the mechanical properties of block polymers prepared by our procedure.

Examples 6A and 6B

Identical conditions and procedures are followed as in Example 5A. The amounts of dry reactants used are shown below:

|  | Example 6A | Example 6B |
|---|---|---|
| Polyether prepolymer, g | 16.8 | 21.6 |
| n-Butylacrylate, g | 16.8 | 21.6 |
| Pyridine, g | 0.025 | 0.05 |
| t-Butyl hydroperoxide, g | 1.5 | 1.9 |
| T.E.G.D.M., g | 1.2 | 4.4 |

Figure 6:
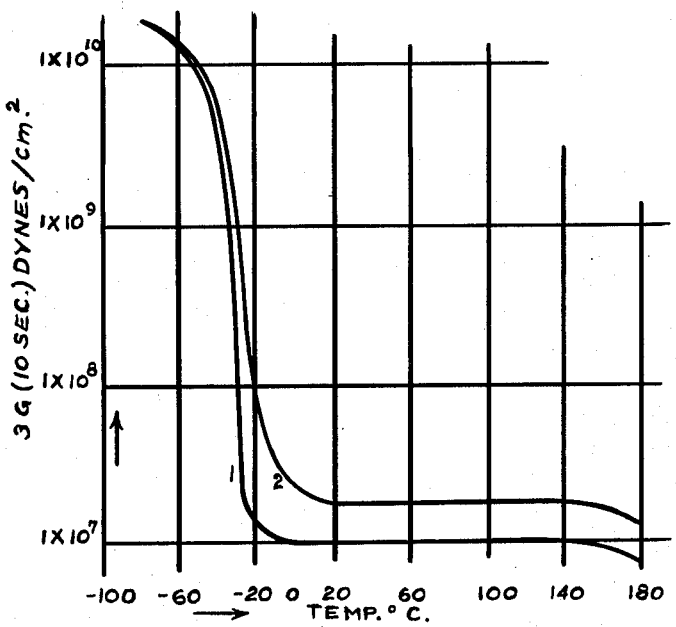

The elastic modulus of the cast film obtained from the polymer of Examples 6A is shown in FIG. 6 as curve 1. The elastic modulus of the film obtained from the material of Example 6B is shown in FIGURE 6 as curve 2.

(Examples 7A and 7B)

The following dry components are mixed in screw cap bottles:

|  | Example 7A | Example 7B |
|---|---|---|
| Polyether prepolymer, g | 10.58 | 22.7 |
| Isoprene (distilled from calcium hydride), g | 28.23 | 7.2 |
| t-Butyl hydroperoxide, g | 1.0 | 2.0 |
| Pyridine, g | 0.05 | 0.05 |

Figure 7:
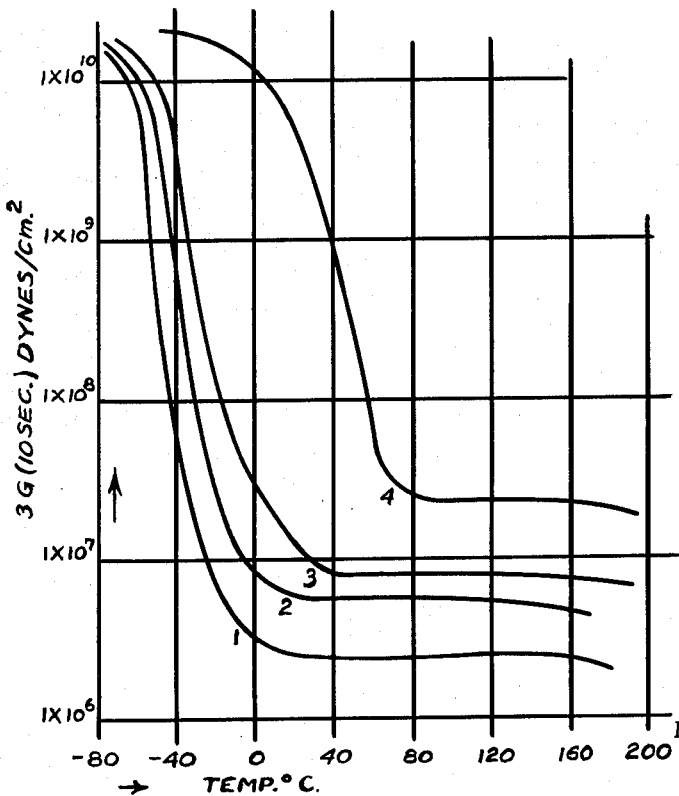

The mixtures are heated in an oven at 60° C.±2° for 12 hours and at 100° C.±2° for an additional period of 12 hours. The elastic modulus-temperature spectrum of the rubbery solids obtained were determined and are shown in FIGURE 7. The materials prepared in Example 7A and Example 7B are represented in FIGURE 7 by the curves 1 and 2 respectively.

Examples 7C and 7D

Identical procedure, conditions and components are used as in Example 7B except that t-butyl hydroperoxide is replaced by diisopropylbenzene hydroperoxide (Example 7C) and paramenthane hydroperoxide (Example 7D). The rubbery materials obtained exhibited very similar elastic modulus-temperature spectra as the material prepared in Example 7B (FIGURE 7, curve 2).

Examples 8A and 8B

The following dry components are mixed in screw cap glass bottles:

|  | Example 8A | Example 8B |
|---|---|---|
| Castor oil triisocyanate, g | 18.1 | 8.73 |
| Isoprene, g | 18.1 |  |
| t-Butyl hydroperoxide, g | 3.17 | 1.9 |
| Styrene, g |  | 13.5 |
| Pyridine, g | 0.05 | 0.025 | solid rubbery materials are obtained after heating the above mixtures at 60°±2° for 24 hours. The elastic modulus of the polymer prepared in Examples 8A and 8B is shown in FIGURE 7 as curves 3 and 4 respectively.

Example 9

3.6 g. of polyether prepolymer, 6.3 g. of dry n-butyl acrylate, 0.3 g. of dry t-butyl hydroperoxide and 0.05 g. of dry pyridine, are mixed in a glass jar provided with a gas tight lid. The whole is heated in the closed container at 73°±2° for 24 hours and then pressed in a mold at 250° F. and 30,000 lbs./sq. in. for 1 hour to form a rubbery film.

Example 10

Identical conditions and procedures were used as described in Example 5; the amounts and consituents are as follows:

|  | G. |
|---|---|
| Polyether prepolymer | 3.75 |
| Methylvinyl ketone (dry) | 6.25 |
| t-Butyl hydroperoxide | 0.3 |
| Pyridine | 0.05 |

Using the molding procedure of Example 9 a rubbery film was obtained.

Example 11

The following components are mixed in a glass jair fitted with a gas tight lid:

|  | G. |
|---|---|
| Polyether prepolymer (monoisocyanate) | 6.55 |
| Styrene | 19.31 |
| t-Butyl hydroperoxide | 0.3 |
| Pyridine | 0.025 |

The homogeneous mixture is heated for 12 hours at 60° ±2% and for 24 hours at 100° ±2°. The solid formed is dissolved in 100 cc. of tetrahydrofuran, precipitated with 1l. of methanol, filtered on a Büchner funnel, washed with methanol and dried at 60° C. under vacuum for 24 hours. The dry polymer is molded at 250° F., 30,000 lbs./sq. in. for ½ hour. A clear, transparent film is obtained.

Polymeric peroxy carbamate containing materials are useful in preparing block polymers that have a combination of useful properties. This is illustrated in polymers (of the type prepared in Example 1) having a propylene oxide chain which has inherently rubbery properties and styrene chains which have basically glassy properties. The resultant polymer has the desirable properties of both the rubbery component and the glassy component over a wide range of temperature. The rubbery component imparts impact resistance; whereas, the glassy component imparts a high modulus of elasticity. In other cases where the fluidity of materials used in casting processes is desirable it is possible to produce predominantly rubbery materials having low glass transition temperatures. The block polymers may be prepared as foamed material. These merely illustrate the great variety of novel polymers having unique combinations of properties that may be prepared by our process.

Though the invention has been described with reference to only a limited number of examples it is to be understood that variants thereof may be produced without departing from its spirit or scope.

What is claimed is:

1. As a new compound, a block copolymer corresponding to the following formula:

$$(Ra)_n Z$$

wherein

R is a polyvinyl chain, n is an integer, a is a urethane linkage and is substantially the only link between R and Z, and Z is a polymeric moiety derived from a polymer having at least one active hydrogen atom and has a molecular weight of at least 1000 and is also at least 20% by weight of the block copolymer.

2. As a new compound, a block copolymer containing repeating units, each unit corresponding to the following formula:

$$\{(aRa)Z\}$$

wherein

R is a polyvinyl chain, a is a urethane linkage and is substantially the only link between R and Z, y is an integer, and Z is a polymeric moiety derived from a polymer having at least two active hydrogen atoms and comprises a polymer in which all carbon to carbon bonds are saturated with respect to vinyl type polymerization and is at least 20% by weight of the block polymer.

3. The block copolymer of claim 2 wherein the Z refers to a polyether having a molecular weight in excess of 1000.

4. The composition of claim 3 wherein the polyether is polypropylene oxide.

5. The composition of claim 3 wherein the polyether is polyethylene oxide.

6. The composition of claim 2 wherein the Z refers to a saturated polyester having a molecular weight in excess of 1000.

7. The composition of claim 2 wherein the polyester is formed from adipic acid, ethylene glycol and propylene glycol.

8. As a new composition, a branched or crosslinked block copolymer containing repeating units, each unit corresponding to the following symbolic formula:

$$\{(aRa)_n Z\}_y$$

wherein y is an integer and n is an integer, two or larger

R is a polyvinyl chain, a is a urethane linkage and is substantially the only link between R and Z, and Z is a polymeric moiety derived from a polymer having at least two active hydrogen atoms and comprises a polymer in which all carbon to carbon bonds are saturated with respect to vinyl type polymerization and is at least 20% by weight of the block polymer.

References Cited by the Examiner

UNITED STATES PATENTS

| | | | |
|---|---|---|---|
| 2,915,493 | 12/1959 | Nischk et al. | 260—859 |
| 2,977,330 | 3/1961 | Brower | 260—2.5 |
| 3,007,894 | 11/1961 | Bunge et al. | 260—859 |
| 3,008,917 | 11/1961 | Park et al. | 260—859 |
| 3,047,530 | 7/1962 | Nischk et al. | 260—859 |

MURRAY TILLMAN, *Primary Examiner.*

WILLIAM H. SHORT, *Examiner.*

P. LIEBERMAN, *Assistant Examiner.*